April 15, 1958     K. W. JOHNSON     2,830,807
VIBRATION ISOLATOR
Original Filed Nov. 2, 1953
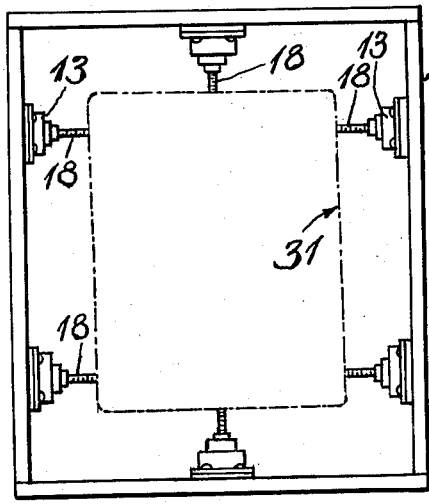
FIG. 1
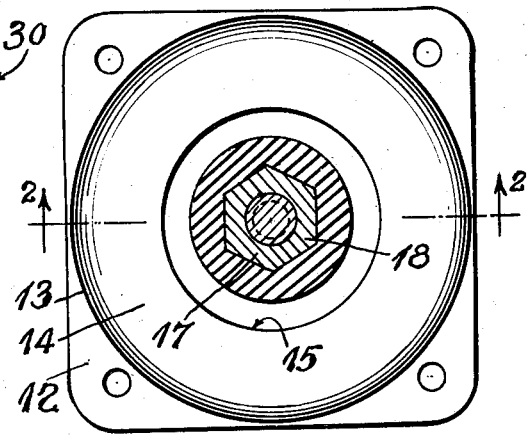
FIG. 4
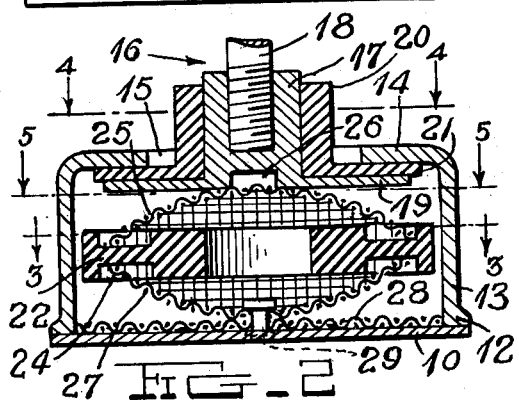
FIG. 2
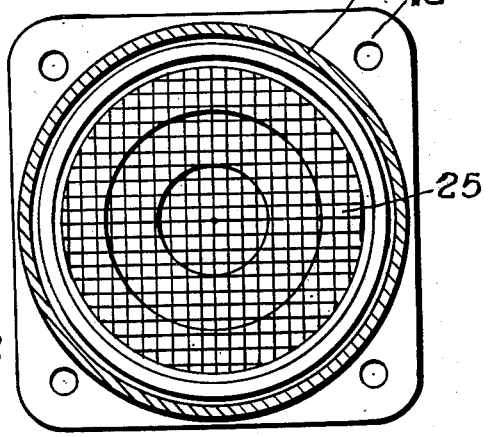
FIG. 5
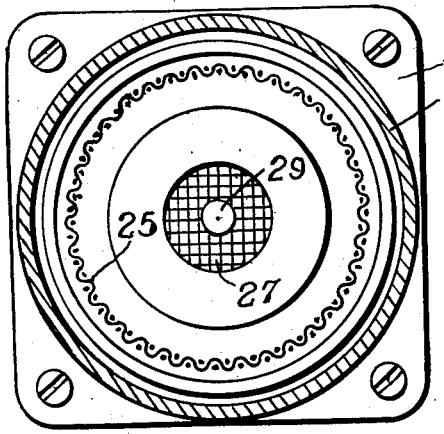
FIG. 3
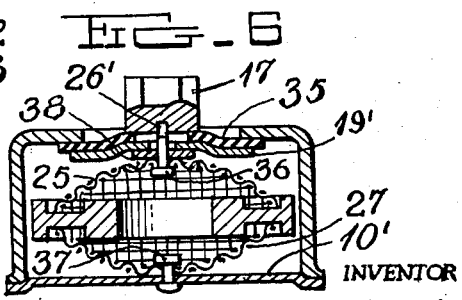
INVENTOR
KENNETH W. JOHNSON
BY
ATTORNEY

United States Patent Office 2,830,807
Patented Apr. 15, 1958

2,830,807

VIBRATION ISOLATOR

Kenneth W. Johnson, Dayton, Ohio

Original application November 2, 1953, Serial No. 389,710, now Patent No. 2,778,628, dated January 22, 1957. Divided and this application July 26, 1956, Serial No. 600,351

10 Claims. (Cl. 267—1)

The present invention relates to a vibration isolator and it consists in the combinations, constructions and arrangements of parts herein described and claimed.

Generally there is provided a vibration isolator comprising a housing in the form of a hollow cylinder or cup flanged inwardly at its top to provide a constricted opening through which extends an anchoring member whose inner end is provided with an outwardly extending annular flange for maintaining the inner end of the anchoring member within the housing. The inner end of the anchoring member bears against a pair of novel spring elements, each of which is composed of a dished metal cloth or screen composed of pluralities of spaced wires extending perpendicularly to each other. The spring elements are interposed between the inner flanged portion of the anchoring member and the bottom of the housing. Novel means are provided for maintaining the spring elements in their proper positions. The device is such that it may be used singly or in multiples as a part of a system.

It is accordingly an object of the invention to provide a unit of the character set forth which is fully self-contained.

Another object of the invention is to provide a device of the character set forth which is capable of long life under all climatic and weather conditions.

A further object of the invention is to provide a device of the character set forth having greater stability in the horizontal plane than similar devices presently in use.

A further object of the invention is to provide a device of the character set forth having damping forces which are proportional to displacement and proportional to load.

Another object of the invention is to provide a device of the character set forth having a novel spring system adapted to occupy a minimum of space and to provide a maximum of horizontal cushioning.

A further object of the invention is to provide a device of the character set forth which will operate satisfactorily in an inclined position with respect to its normal position.

Other and further objects of the invention will become apparent from a reading of the following specification taken in conjunction with the drawing, in which:

Figure 1 is a plan view of a supporting structure illustrating a plurality of units of the present invention in use therein, Figure 2 is a vertical sectional view taken along line 2—2 of Figure 4, illustrating one form of the present invention, Figure 3 is a sectional view taken along line 3—3 of Figure 2, Figure 4 is a sectional view taken along line 4—4 of Figure 2, Figure 5 is a sectional view taken along line 5—5 of Figure 2, and Figure 6 is a view similar to Figure 2 but showing a modified form thereof.

Referring more particularly to the drawing, there is shown therein, in Figures 2 to 5, inclusive, a device of the character set forth, comprising a substantially square base plate 10 atop which is fastened by means of screws or the like a similarly shaped flange 12 formed integrally with the lower end of a hollow cylindrical housing 13 having an integrally formed top 14 provided with a centrally disposed circular opening 15.

An anchoring element is generally indicated at 16 and comprises a hexagonal body 17 internally threaded in its outer portion for the reception thereof of a bolt 18 and provided at its lower end with an integrally formed annular flange 19 which lies within the housing 13, the body 17 extending through the opening 15.

A cylindrical buffer member 20, preferably formed of rubber or the like, closely surrounds the body 17 and is provided at its inner end with an outwardly extending circular flange 21 which bears against the upper face of the member 19 and against the underside of the top 14.

A ring 22 of yieldable material is centrally and horizontally disposed within the housing 13 and is provided with annular grooves 23 and 24 located in the upper and lower faces thereof, respectively, adjacent the peripheral edge thereof.

A concavo-convex load-carrying element 25 has its peripheral edge portion mounted in the groove 23 while its convex side centrally bears against the central portion of the flange 19, the inner end of the body 17 having a centrally disposed recess 26. A like concavo-convex load-carrying element 27 has its peripheral portion mounted in the groove 24 and presents its convex side downwardly.

A disc 28 of spring material is centrally attached to the member 27 as by a headed pin 29, and in turn disc 28 is attached to the base 10.

In the operation of this form of the invention it will be apparent that the device may be affixed singly or in multiples to, for example, an object or load indicated in dotted lines at 31. It will be apparent that the load carrying elements 25 and 27 are each formed of wire screen material, the individual wires of which extend at right angles to one another and that hence each individual wire constitutes in itself a spring. Since the various wires of each of the elements 25 and 27 extend at right angles to one another, it will be apparent that each of the elements constitutes a great many springs in itself. It will also be apparent that as a load is impressed downwardly upon the elements 25 and 27 through the bolt 18 and the member 16, that the motion of the load will be dampened by the peripheral portions of such elements impinging against the yieldable material of the ring 22, such peripheral portions being mounted in the grooves 23 and 24 as heretofore set forth. It will also be apparent that loads placed upon the device in other than a vertical downward direction as viewed, for example, in Figure 2, that such loads will likewise be absorbed by the elements 25 and 27 and dampened by the ring 22 as well as by the yieldable elements 20 and 21. During such inclined positioning of the bolt 18 it will be apparent that the elements 25 and 27 will likewise be somewhat inclined and it will be seen that the disc 28 provides an elastic support for the member 27 during such action. Again, as a load upon the bolt 18 becomes greater and greater, more and more surface of the flange 19 will come to bear against the convex side of the element 25 thus providing a cushioning action. This is true whether the load in such case comes directly downwardly or at an angle to the vertical as viewed in Figure 2. It will also be apparent that as element 13 with its base plate 10 are inclined at greater angles, as for example, up to 90°, that ring 22 bears against the wall of housing 13 causing elements 25 and 27 to assume the load perpendicular to the load carrying axis.

In Figure 6, a slight modification of the device illustrated in Figure 2 is shown. Here, in lieu of the buffer member 20 and disc 28, a disc 35 formed of a yieldable material, such as rubber, knitted wire or mesh, or the like is provided as shown. In this embodiment, a headed pin 36 and a washer 38 centrally lock and hold in position the carrying element 25, the headed pin 36 protruding into a recess 26' in the hexagonal shaped member 17. As shown, a rivet 37 centrally interconnects base 10' with the load carrying element 27. If desired, a plurality of load-carrying elements 25 and 27 may also be provided whenever it is desirable to increase the load-carrying and damping forces of the device of the invention.

While but two forms of the invention have been shown and described herein, it will be readily apparent to those skilled in the art that many minor modifications may be made without departing from the spirit of the invention or the scope of the appended claims.

This application is a division of my application Serial No. 389,710, filed November 2, 1953, and now Patent No. 2,778,628, dated January 22, 1957.

What is claimed is:

1. A device of the character described comprising a hollow casing, a base affixed to one end of said casing, a top having a circular opening therein affixed to the other end of said casing, an anchoring element extending outwardly through said opening and having a flange extending beyond the edges of said opening inwardly of said top, a ring disposed horizontally in said casing and having an annular groove in each of the upper and lower faces thereof, a concavo-convex yieldable element affixed to said base, and a like element interposed between said ring and said anchoring element, said yieldable elements each having its peripheral edge portion disposed in one of said grooves.

2. A device of the character described comprising a hollow casing, a base affixed to one end of said casing, a top having a circular opening therein affixed to the other end of said casing, an anchoring element extending outwardly through said opening and having a flange extending beyond the edges of said opening inwardly of said top, a ring disposed horizontally in said casing and having an annular groove in each of the upper and lower faces thereof, a concavo-convex yieldable element affixed to said base, a like element interposed between said ring and said anchoring element, said yieldable elements each having its peripheral edge portion disposed in one of said grooves, and means for attaching a load-attaching bolt to the body of said load-anchoring element.

3. A device of the character described comprising a hollow casing, a base affixed to one end of said casing, a top having a circular opening therein affixed to the other end of said casing, an anchoring element extending outwardly through said opening and having a flange extending beyond the edges of said opening inwardly of said top, a ring disposed horizontally in said casing and having an annular groove in each of the upper and lower faces thereof, a concavo-convex yieldable element affixed to said base, a like element interposed between said ring and said anchoring element, said yieldable elements each having its peripheral edge portion disposed in one of said grooves, means for attaching a load-attaching bolt to the body of said load-anchoring element, and a buffer surrounding said anchoring element and interposed between the flange thereof and said top.

4. A device as defined in claim 1 wherein each of said yieldable elements is formed of metal screen material.

5. A device as defined in claim 2 wherein each of said yieldable elements is formed of metal screen material.

6. A device as defined in claim 3 wherein each of said yieldable elements is formed of metal screen material.

7. A device of the character described comprising a hollow casing, a base affixed to one end of said casing, a top having a circular opening therein affixed to the other end of said casing, an anchoring element extending outwardly through said opening and having a flange extending beyond the edges of said opening inwardly of said top, a ring of yieldable material disposed horizontally in said casing and having an annular groove in each of the upper and lower faces thereof, a concavo-convex yieldable element affixed to said base, a like element interposed between said ring and said anchoring element, said yieldable elements each having its peripheral edge portion disposed in one of said grooves, and means for attaching a load-attaching bolt to the body of said load-anchoring element, and a buffer surrounding said anchoring element and interposed between the flange thereof and said top.

8. A device of the character described comprising a hollow casing, a base affixed to one end of said casing, a top having a circular opening therein affixed to the other end of said casing, an anchoring element extending outwardly through said opening and having a flange extending beyond the edges of said opening inwardly of said top, a ring of yieldable material disposed in said casing, a concavo-convex element affixed to said base, a like element interposed between said ring and said anchoring element, said yieldable elements each having its peripheral edge portion bearing against said ring, and means for attaching a load-attaching bolt to the body of said load-anchoring element.

9. A device as defined in claim 7 wherein said yieldable elements are each formed of metal screen material.

10. A device as defined in claim 8 wherein said yieldable elements are each formed of metal screen material.

References Cited in the file of this patent

UNITED STATES PATENTS

| | | |
|---|---|---|
| 1,171,722 | Hough | Feb. 15, 1916 |
| 2,565,108 | Zahodiakin | Aug. 21, 1951 |

FOREIGN PATENTS

| | | |
|---|---|---|
| 253,663 | Great Britain | Jan. 23, 1926 |